United States Patent
Feng et al.

(10) Patent No.: US 8,710,815 B2
(45) Date of Patent: Apr. 29, 2014

(54) ADJUSTABLE VOLTAGE REGULATOR WITH DYNAMIC VOLTAGE COMPENSATION

(75) Inventors: Chieh-Min Feng, Zhubei (TW); Ting-Hung Wang, Taipei (TW); Chung-Sheng Cheng, Zhubei (TW); Jian-Rong Huang, Hsinchu (TW)

(73) Assignee: Richtek Technology Corporation, R.O.C., Chupei, Hsin-Chu (TW)

( * ) Notice: Subject to any disclaimer, the term of this patent is extended or adjusted under 35 U.S.C. 154(b) by 462 days.

(21) Appl. No.: 13/160,308

(22) Filed: Jun. 14, 2011

(65) Prior Publication Data
US 2011/0316518 A1 Dec. 29, 2011

Related U.S. Application Data

(60) Provisional application No. 61/358,592, filed on Jun. 25, 2010.

(51) Int. Cl.
*G05F 1/575* (2006.01)
(52) U.S. Cl.
USPC .......................................... 323/283; 323/271
(58) Field of Classification Search
USPC .................. 323/271, 282, 283, 351
See application file for complete search history.

(56) References Cited

U.S. PATENT DOCUMENTS

| | | | | |
|---|---|---|---|---|
| 7,446,520 B2 * | 11/2008 | Hung | | 323/288 |
| 7,701,190 B2 * | 4/2010 | Chen et al. | | 323/288 |
| 7,737,672 B2 * | 6/2010 | Kudo | | 323/284 |
| 7,990,122 B2 * | 8/2011 | Sase et al. | | 323/283 |
| 8,049,476 B2 * | 11/2011 | Schiff | | 323/282 |
| 8,067,927 B2 * | 11/2011 | Wu et al. | | 323/283 |
| 2006/0001408 A1 * | 1/2006 | Southwell et al. | | 323/282 |
| 2006/0055388 A1 * | 3/2006 | Tang et al. | | 323/284 |
| 2009/0243575 A1 * | 10/2009 | Akiyama et al. | | 323/282 |
| 2010/0013450 A1 * | 1/2010 | Huang et al. | | 323/282 |
| 2011/0267019 A1 * | 11/2011 | Krishnamurthy et al. | | 323/283 |
| 2011/0316518 A1 * | 12/2011 | Feng et al. | | 323/349 |
| 2012/0262136 A1 * | 10/2012 | Nien et al. | | 323/272 |
| 2013/0234691 A1 * | 9/2013 | Carroll et al. | | 323/283 |

OTHER PUBLICATIONS

"A Novel Nonlinear Control Method for PWM DC-DC Converter With Optimizing Transient Response", Department of Electrical Engineering, Harbin Institute of Technology, Harbin 150001, China.

* cited by examiner

*Primary Examiner* — Jeffrey Sterrett
(74) *Attorney, Agent, or Firm* — Tung & Associates

(57) ABSTRACT

The present invention discloses a voltage regulator, and a control circuit and a control method therefor. The method for controlling a voltage regulator comprises: receiving a dynamic voltage identification signal which instructs the voltage regulator to change its output voltage to a target voltage, and generating a compensation signal to shorten an interval for the output voltage of the voltage regulator to reach the target voltage.

14 Claims, 8 Drawing Sheets

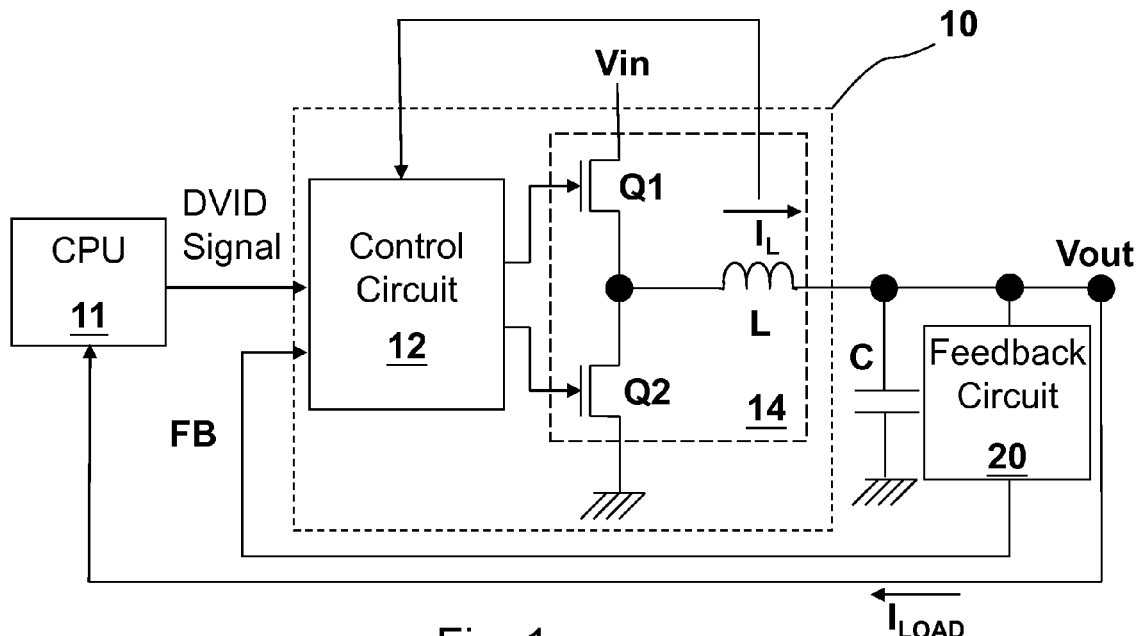
Fig. 1
(Prior Art)
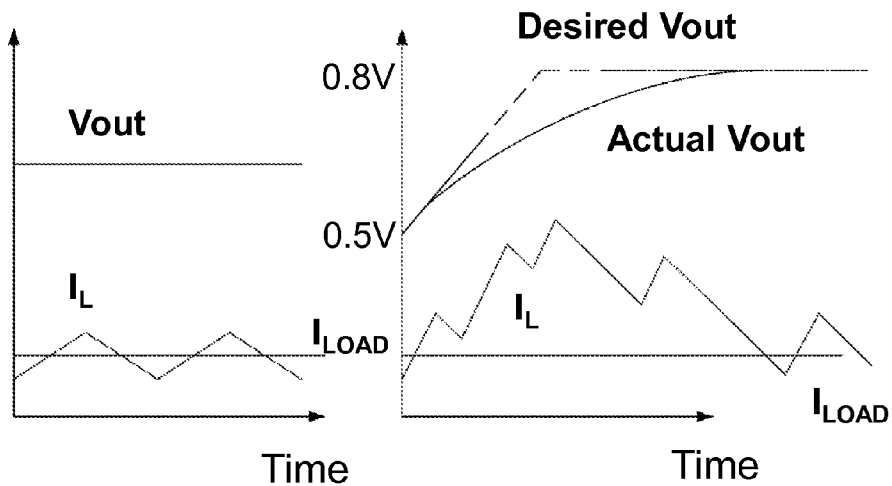
Fig. 2A
(Prior Art)
Fig. 2B
(Prior Art)

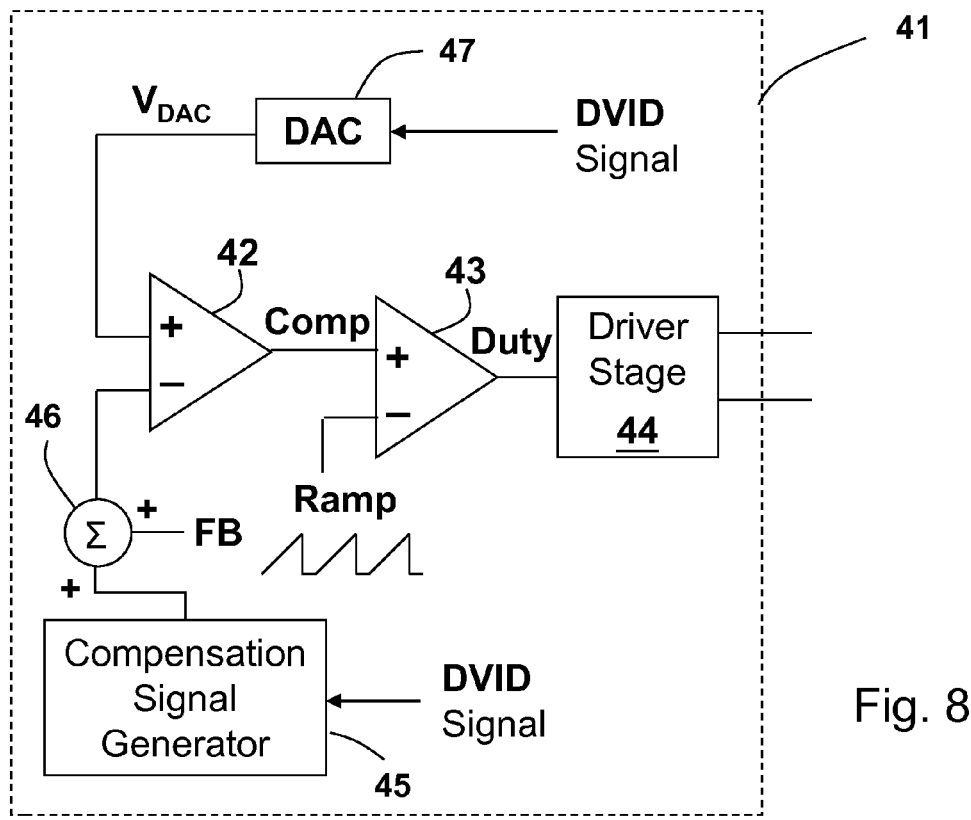
Fig. 8
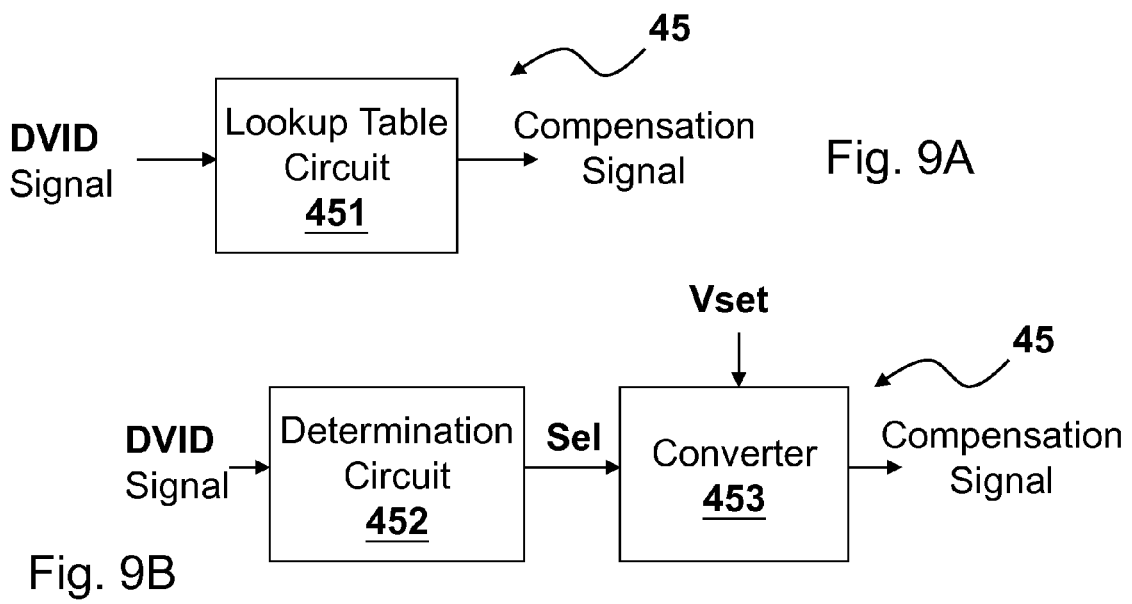
Fig. 9A
Fig. 9B

US 8,710,815 B2

ADJUSTABLE VOLTAGE REGULATOR WITH DYNAMIC VOLTAGE COMPENSATION

CROSS REFERENCE

This application claims the benefit of U.S. Provisional Application No. 61/358,592, filed on Jun. 25, 2010.

BACKGROUND OF THE INVENTION

1. Field of Invention

The present invention relates to a voltage regulator, and a control circuit and a method for controlling the voltage regulator, in particular to such voltage regulator, control circuit and method wherein a compensation signal is generated to adjust the output voltage of the voltage regulator according to a dynamic voltage identification (DVID) signal.

2. Description of Related Art

The major concept of dynamic voltage adjustment is to supply a variable operation voltage to the system. When the system needs to process data in high speed, the voltage is increased to a higher level to enhance the processing speed of a digital signal processor or a microprocessor. When the system does not need to process data in high speed or it is in a stand-by mode, the voltage is decreased to a lower level by an instruction from the system, such that unnecessary power consumption can be saved. Thus, it is required for a voltage regulator supplying the operation voltage to the system to be able to quickly adjust its output voltage so as to meet the requirement from the processor.

FIG. 1 shows a prior art voltage regulator supplying a dynamic voltage to a processor. The voltage regulator 10 comprises a control circuit 12 and a power stage 14. The control circuit 12 controls the power stage 14. The power stage 14 includes two power transistors (Q1, Q2) and an inductor L. The control circuit 12 generates control signals to control the operations of the transistors (Q1, Q2) according to the output voltage Vout or a feedback signal FB extracted from the output side Vout by a feedback circuit 20, an inductor current $I_L$ through the inductor L, and a DVID signal instructed by a CPU (Central Processing Unit) 11, so as to transmit electrical power from the input side Vin to the output side Vout. The inductor current $I_L$ through the inductor L charges a capacitor C. The voltage across the capacitor C is the output voltage Vout at the output side. The load current $I_{LOAD}$ is outputted from the output side and supplied to the CPU 11.

The specification of the DVID signal is defined by Intel in its specification of the voltage regulator module (VRM), which includes instructions for various voltages and corresponding slew rates. For example, the CPU 11 sends a DVID signal to request the output voltage Vout to change from 0.5V to 0.8V by a slew rate of 10 mV/µs, and hence, the voltage regulator 10 needs to raise the output voltage Vout to 0.8V within 30 µs (=(0.8−0.5)/0.01). Intel also lists the specification of load line impedance in the specification, expressed by $\Delta Vout/\Delta I_{LOAD}$. For example, the load line impedance of the voltage regulator 10 is 1 mohm, and $\Delta Vout/\Delta I_{LOAD}$ is possibly desired to be 1 mV/A. That is, when the output voltage Vout drops 10 mV, the load current $I_{LOAD}$ increases 10 A. However, the conventional voltage regulator 10 only detects the inductor current $I_L$, but does not detect the actual load current $I_{LOAD}$ Because this requires disposing a power consuming device on the output path.

Referring to FIG. 2A, when the output voltage Vout of the voltage regulator 10 is at a stable status, the average of the inductor current $I_L$ is equal to the load current $I_{LOAD}$, so in prior art concept, the average of the inductor current $I_L$ can represent the load current $I_{LOAD}$. However, referring to FIG. 2B, when the voltage regulator 10 increases the output voltage Vout from 0.5V to 0.8V in response to the DVID signal from the CPU 11, it increases the inductor current $I_L$ to be larger than the load current $I_{LOAD}$ so as to charge the capacitor C with extra current, such that the output voltage Vout can be raised to a desired target. Meanwhile, the voltage regulator 10 detects the rising inductor current $I_L$, so it mistakes the load current $I_{LOAD}$ to be increasing at the same speed as the increase of the inductor current $I_L$. However, according to the requirement of the load line impedance, the actual output voltage Vout unexpectedly drops (referred to as "droop"). Consequently, the actual output voltage Vout delays its response to reach a higher level, that is, it gets to the target voltage 0.8V later than the expected time point, so it cannot meet the slew rate requirement in specification of the DVID signal. On the contrary, if the desired output voltage Vout needs to drop to 0.5V from 0.8V, an unexpected negative droop or boost occurs in the actual output voltage, and there is a similar delay in the response time of the actual voltage Vout. Even though the load line impedance of the voltage regulator is assumed to be zero, because of the finite bandwidth of the feedback loop in the circuit, the response of the output voltage Vout is still delayed.

In view of above, the present invention overcomes the foregoing drawbacks by providing a voltage regulator and a control circuit and a method, wherein a compensation signal is generated to adjust the output voltage of the voltage regulator according to a dynamic voltage identification (DVID) signal. Consequently, the response time of the actual voltage Vout is improved to solve the problem of the delayed response due to the droop or negative droop.

SUMMARY OF THE INVENTION

An objective of the present invention is to provide a voltage regulator to improve the response time of the actual output voltage such that the problem of the delayed response due to the droop or negative droop is solved.

An objective of the present invention is to provide a control circuit of a voltage regulator.

An objective of the present invention is to provide a control method of a voltage regulator.

To achieve the foregoing objectives, in one aspect, the present invention provides a voltage regulator, comprising: a power stage including at least one power transistor operating to convert an input voltage to an output voltage; a feedback control loop feedback controlling the operation of the power transistor according to the output voltage or a feedback signal related to the output voltage; and a compensation signal generator receiving a dynamic voltage identification (DVID) signal, and when the DVID signal requests the output voltage to change to a target voltage, the compensation signal generator generating a compensation signal to shorten an interval for the output voltage to reach the target voltage.

In the foregoing voltage regulator, the feedback control loop preferably includes: an error amplifier generating an error amplification signal according to (a) the output voltage or the feedback signal related to the output voltage and (b) a voltage signal determined by the DVID signal; and a pulse width modulation (PWM) comparator generating an output signal according to the error amplification signal and a ramp signal so as to directly or indirectly control the power transistor the power stage; wherein the compensation signal is inputted to the feedback control loop in one of the following manners:

(1) the compensation signal being added to the feedback signal as an input to an input terminal of the error amplifier;
(2) the compensation signal being added to the voltage signal determined by the DVID signal as an input to another input terminal of the error amplifier;
(3) the compensation signal being added to the error amplification signal as an input to an input terminal of the PWM comparator; or
(4) the compensation signal being added to the ramp signal as an input to another input terminal of the PWM comparator.

In one of the embodiments, the compensation signal generator includes a lookup table circuit which generates the compensation signal in correspondence to the DVID signal.

In one of the embodiments, the compensation signal generator includes a determination circuit generating a selection signal according to the DVID signal, and a converter converting a predetermined voltage to the compensation signal according to the selection signal, wherein the predetermined voltage is a constant, or is variable in correspondence to a different value of the DVID signal.

In another aspect, the present invention provides a control circuit for controlling a voltage regulator to convert an input voltage to an output voltage, the control circuit comprising: a error amplifier generating an error amplification signal according to (a) the output voltage or a feedback signal related to the output voltage and (b) a voltage signal determined by a DVID signal; a pulse width modulation (PWM) comparator generating an output signal according to the error amplification signal and a ramp signal so as to directly or indirectly control a conversion from the input voltage to the output voltage; and a compensation signal generator receiving the DVID signal, and when the DVID signal requests the output voltage to change to a target voltage, the compensation signal generator generating a compensation signal to shorten an interval for the output voltage to reach the target voltage, wherein the compensation signal is inputted in one of the following manners:
(1) the compensation signal being added to the feedback signal as an input to an input terminal of the error amplifier;
(2) the compensation signal being added to the voltage signal determined by the DVID signal as an input to another input terminal of the error amplifier;
(3) the compensation signal being added to the error amplification signal as an input to an input terminal of the PWM comparator; or
(4) the compensation signal being added to the ramp signal as an input to another input terminal of the PWM comparator.

In another aspect, the present invention provides a control method for controlling a voltage regulator to convert an input voltage to an output voltage, the control method comprising: providing a feedback control loop feedback controlling a conversion from an input voltage to an output voltage according to the output voltage or a feedback signal related to the output voltage; receiving a dynamic voltage identification (DVID) signal; and generating a compensation signal as an input to the feedback control loop to shorten an interval for the output voltage to reach a target voltage when the DVID signal requests the output voltage to change to the target voltage.

The present invention can be applied to synchronous or asynchronous buck converters, boost converters, inverting converters, and buck-boost converters, operating for example in pulse width modulation mode or pulse frequency modulation mode.

The objectives, technical details, features, and effects of the present invention will be better understood with regard to the detailed description of the embodiments below, with reference to the drawings.

BRIEF DESCRIPTION OF THE DRAWINGS

FIG. 1 shows a prior art voltage regulator supplying a dynamic voltage to a processor.
FIGS. 2A and 2B show the waveform diagrams of the output voltage Vout of the prior art voltage regulator.
FIGS. 6-8 show several other embodiments of the control circuit of the present invention.
FIGS. 9A-9B show two embodiments of the compensation signal generator of the present invention.

DESCRIPTION OF THE PREFERRED EMBODIMENTS

Figure 3:
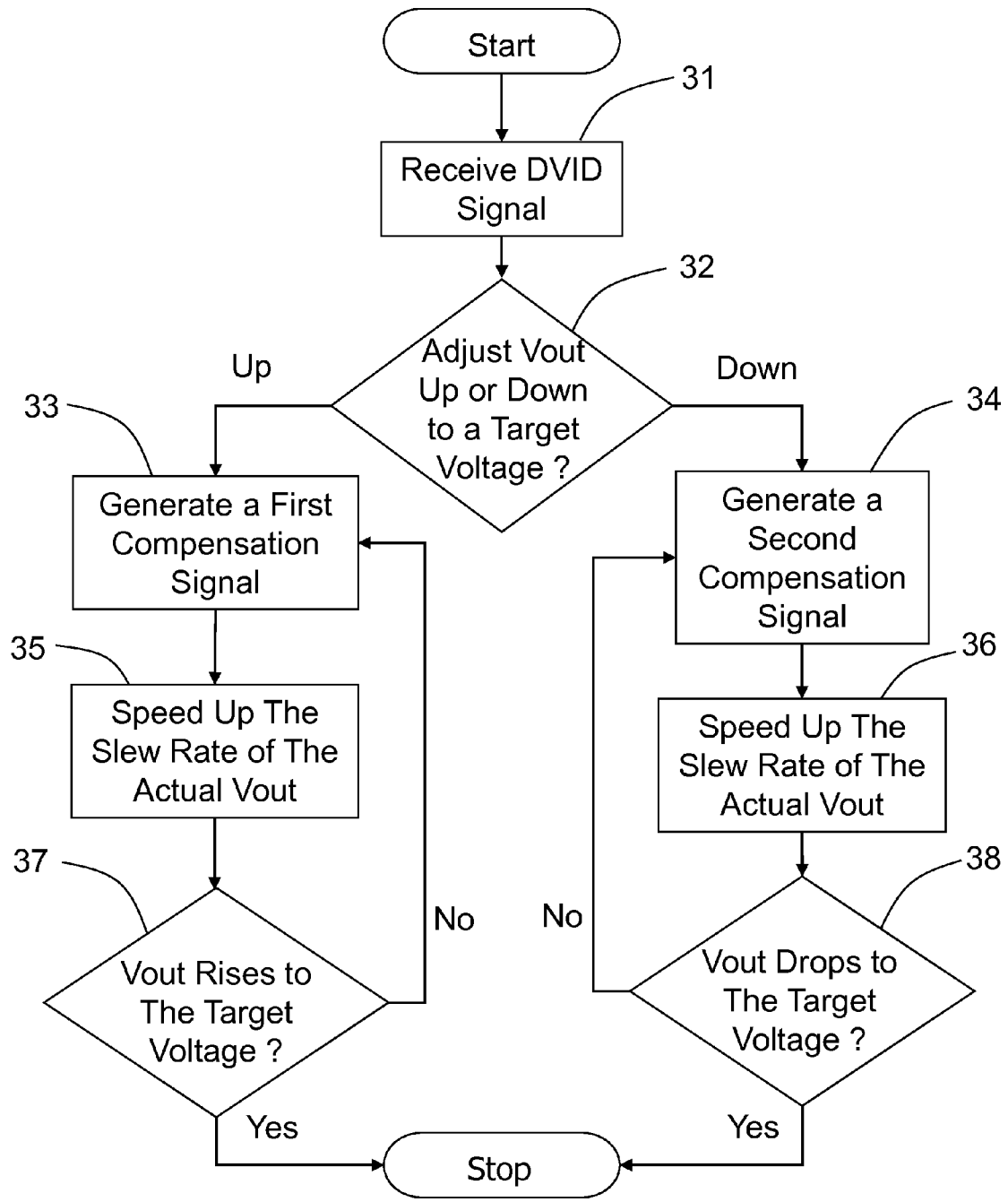
FIG. 3 shows a flow chart, illustrating the control method of the present invention.

FIG. 3 shows a flow chart, illustrating the control method of the present invention. As shown in Step 31, a voltage regulator receives a DVID signal from a CPU. The signal instructs the voltage regulator to change its output voltage. The check of Step 32 is executed next. When the signal requests the output voltage to rise to a higher target voltage, the process goes to Step 33; when the signal requests the output voltage to drop to a lower target voltage, the process goes to Step 34. As shown in Steps 33 and 35, the voltage regulator generates a first compensation signal to accelerate the rising speed of the output voltage such that the slew rate of the output voltage approaches the desired slew rate requested by the specification of the DVID signal, and thus shortening an interval for the output voltage to reach the target value. When the output voltage reaches the target value, the process stops in Step 37; otherwise, the process goes back to Step 33.

As shown in Steps 34 and 36, the voltage regulator generates a second compensation signal to accelerate the dropping speed of the output voltage such that the slew rate of the output voltage approaches the desired slew rate requested by the specification of the DVID signal, and thus shortening an interval for the output voltage to reach the target value. When the output voltage reaches the target value, the process stops in Step 38; otherwise, the process goes back to Step 34.

Figure 4:
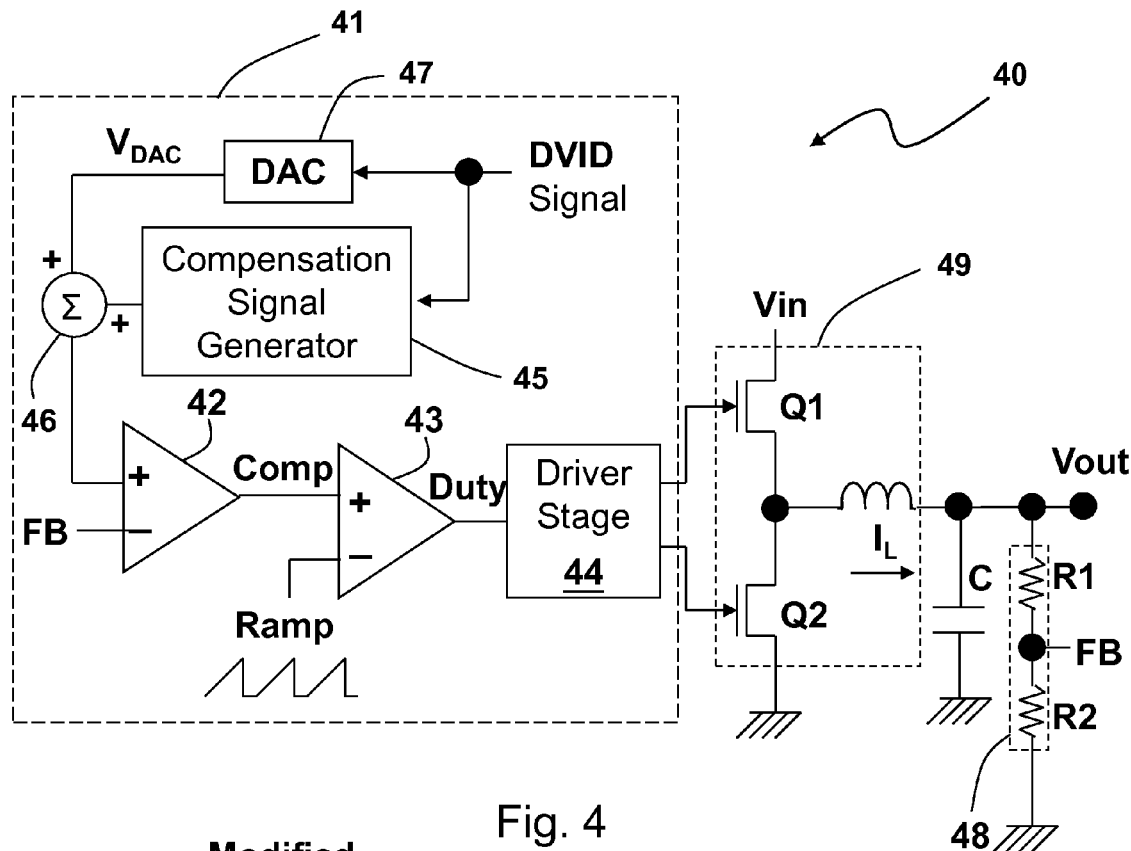
FIG. 4 shows an embodiment the voltage regulator of the present invention.

The foregoing control method can be embodied in various ways in a voltage regulator. For example, the first compensation signal and the second compensation signal can be used to directly or indirectly change the on and/or off time of the power transistors (Q1 and Q2) so as to shorten the interval for the output voltage to reach the target value, and thus satisfying the requirement defined by the specification of the DVID signal. FIG. 4 shows an embodiment of the voltage regulator of the present invention. The voltage regulator is shown to be a synchronous buck converter operating in pulse width modulation mode as an example. However, the present invention can be applied to synchronous or asynchronous buck power converters, boost power converters, inverting power converters, and buck-boost power converters, operating for example in pulse width modulation mode or pulse frequency modulation mode. Referring to FIG. 4, the voltage regulator 40 of this embodiment comprises a control circuit 41 controlling the operation of the power transistors (Q1, Q2) of the power stage 49 to convert electrical power from the input side Vin to the output side Vout. The control circuit 41 comprises an error amplifier 42, a PWM comparator 43, and a driver stage 44, and further comprises a compensation signal generator 45, an adder 46, and a digital to analog converter (DAC) 47. The compensation signal generator 45 and the DAC 47 both receive the DVID signal, wherein the DAC 47 outputs a voltage signal $V_{DAC}$ corresponding to the DVID signal, and the compensation signal generator 45 generates a compensation signal according to the DVID signal. The compensation signal can be a positive signal or a negative signal, depending on the direction of the output voltage Vout to be changed toward. The adder 46 adds the voltage signal $V_{DAC}$ to the compensation signal, and outputs a sum signal as a reference signal to the error amplifier 42. The function of the compensation signal is to accelerate the slew rate of the output voltage Vout. In prior art, only the voltage signal $V_{DAC}$ is used as the reference signal, and the slew rate of the output voltage Vout is not satisfactory. The error amplifier 42 compares the feedback signal FB with the sum signal to generate an error amplification signal Comp. The PWM comparator 43 compares the error amplification signal Comp with the ramp signal Ramp to generate a duty signal Duty. The driver stage 44 drives the power transistors Q1 and Q2 according to the duty signal Duty. The feedback circuit 48 includes two resisters R1 and R2 connected to each other in series. One terminal of the resister R1 is coupled to the output voltage Vout, and one terminal of the resister R2 is coupled to ground. The feedback signal FB is a dividend voltage extracted from the resister R2.

Figure 5:
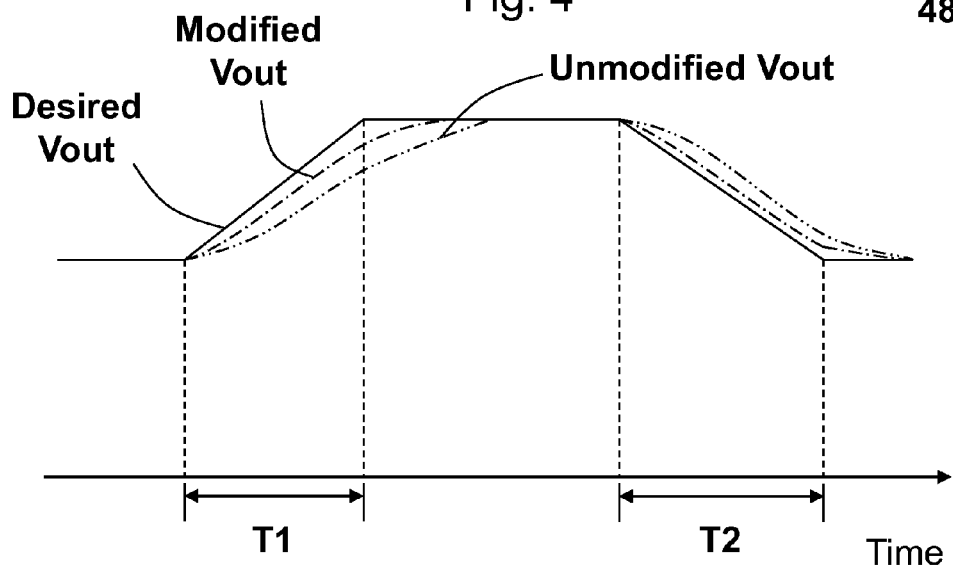
FIG. 5 shows a schematic diagram, illustrating the waveform of the output voltage of the voltage regulator according to the present invention.

FIG. 5 shows a schematic diagram, illustrating the waveform of the output voltage of the voltage regulator according to the present invention. During the period T1, the DVID signal requests the output voltage Vout to rise according a predetermined waveform. As described in the above, the output voltage of the prior art voltage regulator has a serious droop problem, as shown by the waveform of the unmodified Vout in this figure. However, by applying the present invention to the voltage regulator, the droop problem can be solved because the compensation signal generator provides the compensation signal to improve the slew rate of the output voltage Vout. Referring to the waveform of the modified Vout in this figure, the slew rate of the modified Vout is much better than that of the unmodified Vout. During the period T2, the DVID signal requests the output voltage Vout to drop according a predetermined waveform. As described in the above, the output voltage of the prior art voltage regulator has a serious negative droop (insufficient drop) problem, as shown by the waveform of the unmodified Vout in this figure. However, by applying the present invention to the voltage regulator, the negative droop problem can be solved because the compensation signal generator provides the compensation signal to improve the slew rate of the output voltage Vout. Referring to the waveform of the modified Vout in this figure, the slew rate of the modified Vout is much better than that of the unmodified Vout.

Figure 6:
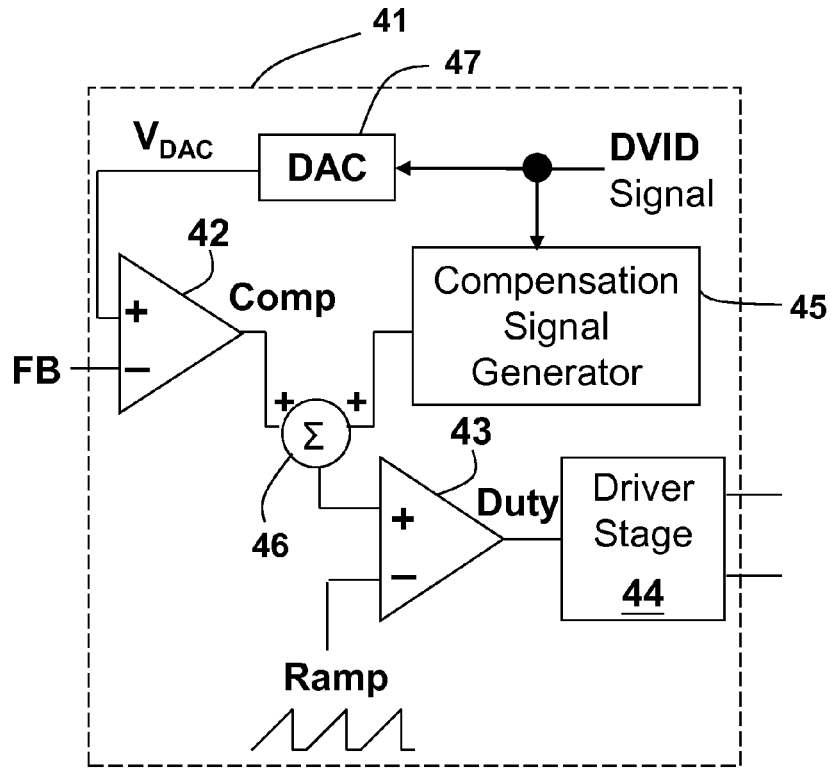
Figure 7:
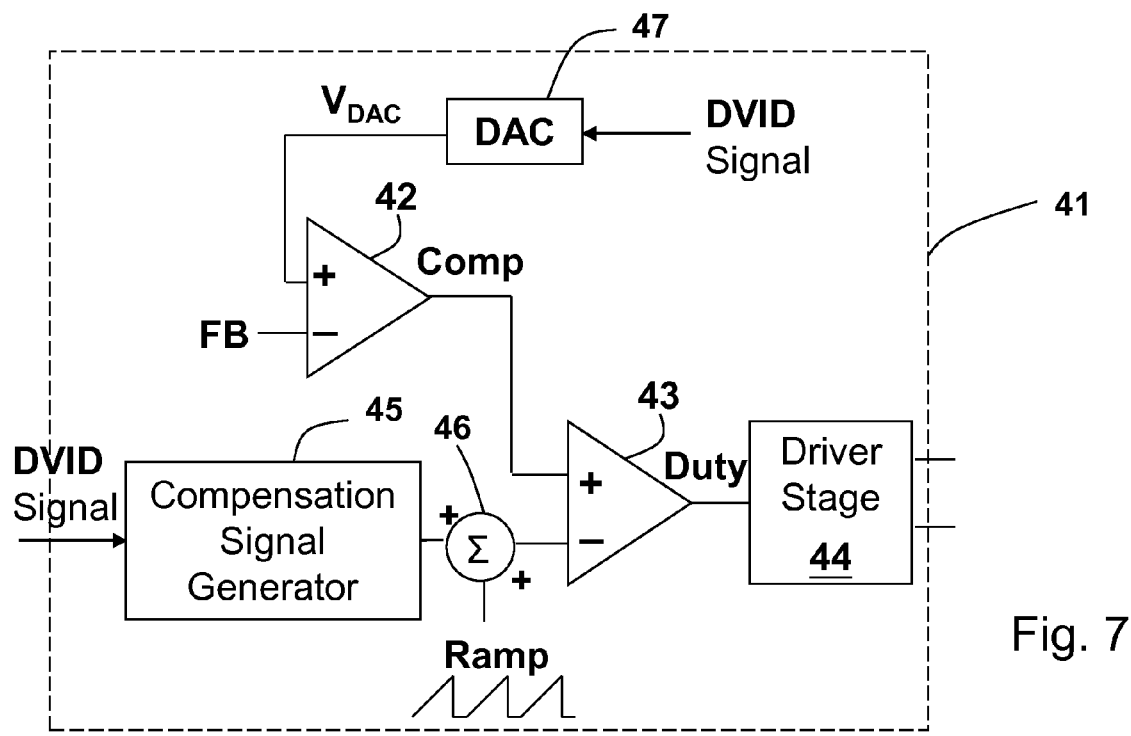

What FIG. 4 shows is only one embodiment among many possible variations. The compensation signal can be fed to the control circuit 41 at other proper nodes, as long as it can directly or indirectly change the on and/or off time of the transistors Q1 and Q2 to shorten an interval for the output voltage of the voltage regulator to reach the target voltage. Any such circuits achieving such purpose by a compensation signal should be included in the scope of the present invention. For example, referring to FIG. 6, the adder 46 can be moved to the output terminal of the error amplifier 42. That is, the compensation signal is added to the error amplification signal Comp. Or, referring to FIG. 7, the compensation signal can be added to the ramp signal Ramp. Moreover, referring to FIG. 8, the compensation signal can be added to the feedback signal FB. Also, the DVID signal or the compensation signal can be used to directly adjust the duty signal Duty.

Figure 10:
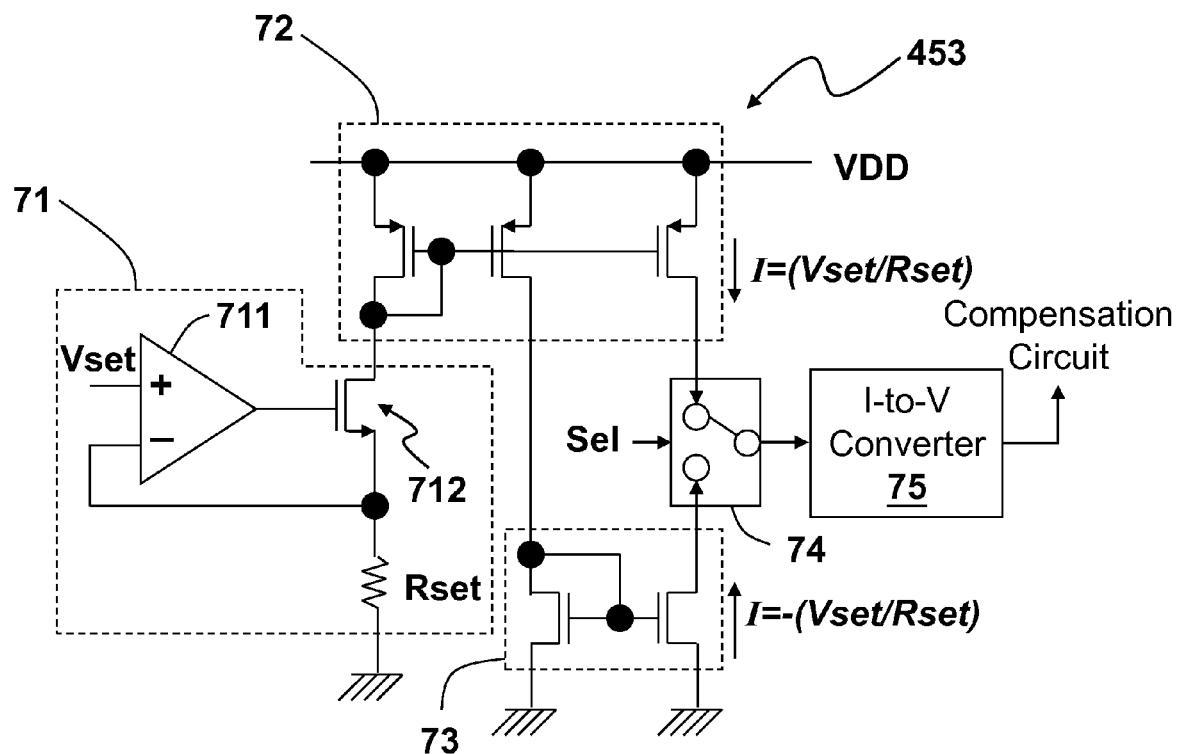
FIG. 10 shows an embodiment of the converter in FIG. 9B.
Figures 11A, 11B, 11C:
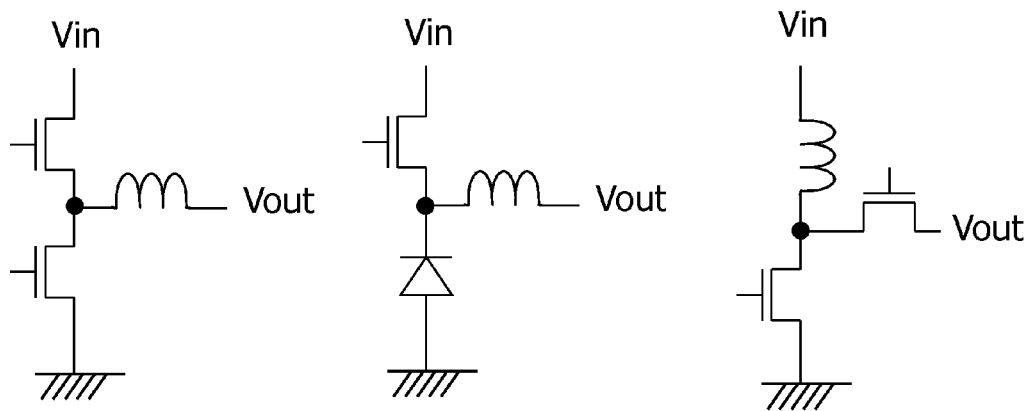
FIGS. 11A-11J show other types of the power stage of the voltage regulator.
Figure 11D:
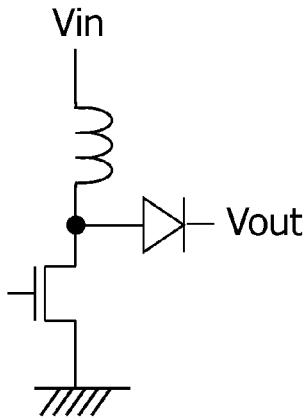
Figure 11E:
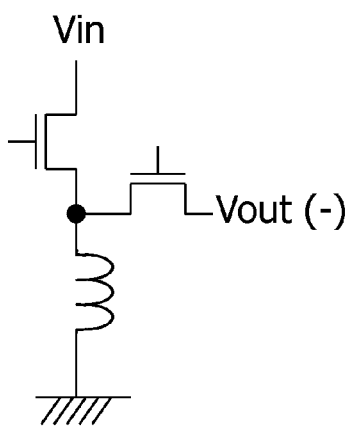
Figure 11F:
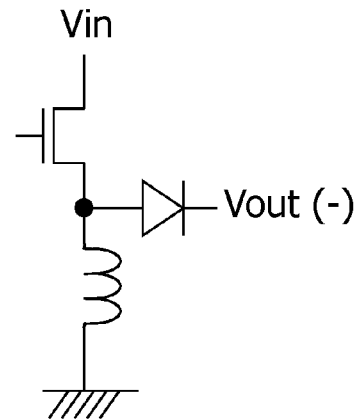
Figure 11G:
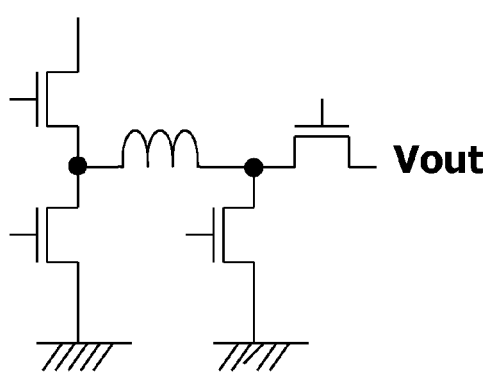
Figure 11H:
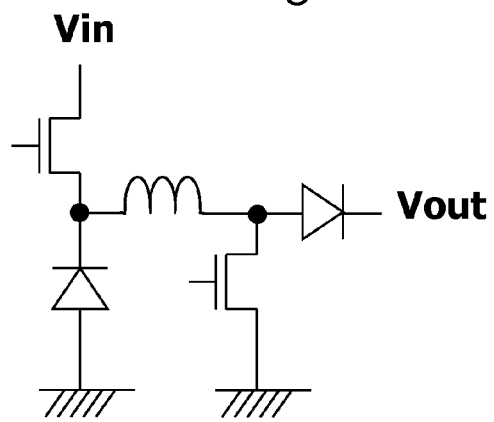
Figure 11I:
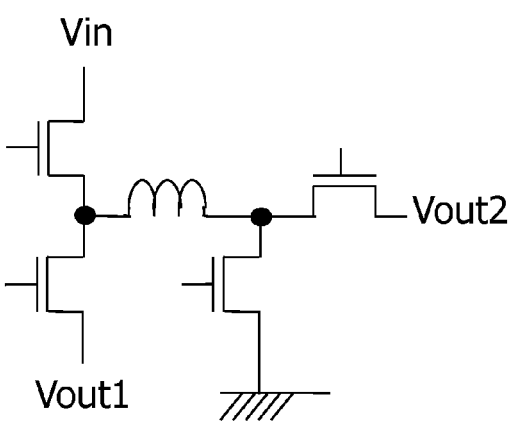
Figure 11J:
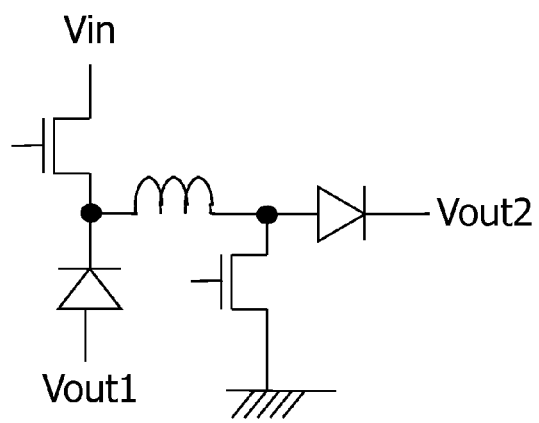

The compensation signal generator 45 can be embodied in several manners. FIGS. 9A-9B show two embodiments of the compensation signal generator of the present invention. Referring to FIG. 9A, the compensation signal can be generated in correspondence to the DVID signal by a lookup table circuit 451. Referring to FIG. 9B, the compensation signal circuit 45 can include a determination circuit 452 which determines whether the output voltage Vout should be increased or decreased according to the DVID signal, and generates a selection signal Sel. According to the selection signal Sel, the converter 453 converts a predetermined voltage Vset to a proper compensation signal. The predetermined voltage Vset may be a constant, or may be variable in correspondence to a different value of the DVID signal. One embodiment of the converter 453 is shown in FIG. 10. The converter 453 includes a voltage to current converter 71, current mirrors (72, 73), a selection circuit 74 and a current to voltage converter 75. The voltage to current converter 71 includes an operation amplifier 711, a transistor 712, and a resistor Rset. Since the signal Vset is inputted to the positive input terminal of the operation amplifier 711, the current through the resister Rset is equal to Vset/Rset. The current mirror 72 mirrors the current to generate a positive current of Vset/Rset, whereas the mirror 74 mirrors the current to generate a negative current of −(Vset/Rset). The selection circuit 74 determines whether to select the positive current or the negative current according to the selection signal Sel. The current to voltage converter 75 converts the output of the selection circuit 74 to a voltage signal and outputs the signal as the compensation signal. The foregoing embodiments are just some examples among many possible variations. The scope of the present invention should include any circuits which is able to generate the compensation signal according to the DVID signal or other signals indicating that the output voltage is required to be changed (such as by detecting the variation of the output voltage Vout).

Figure 12:
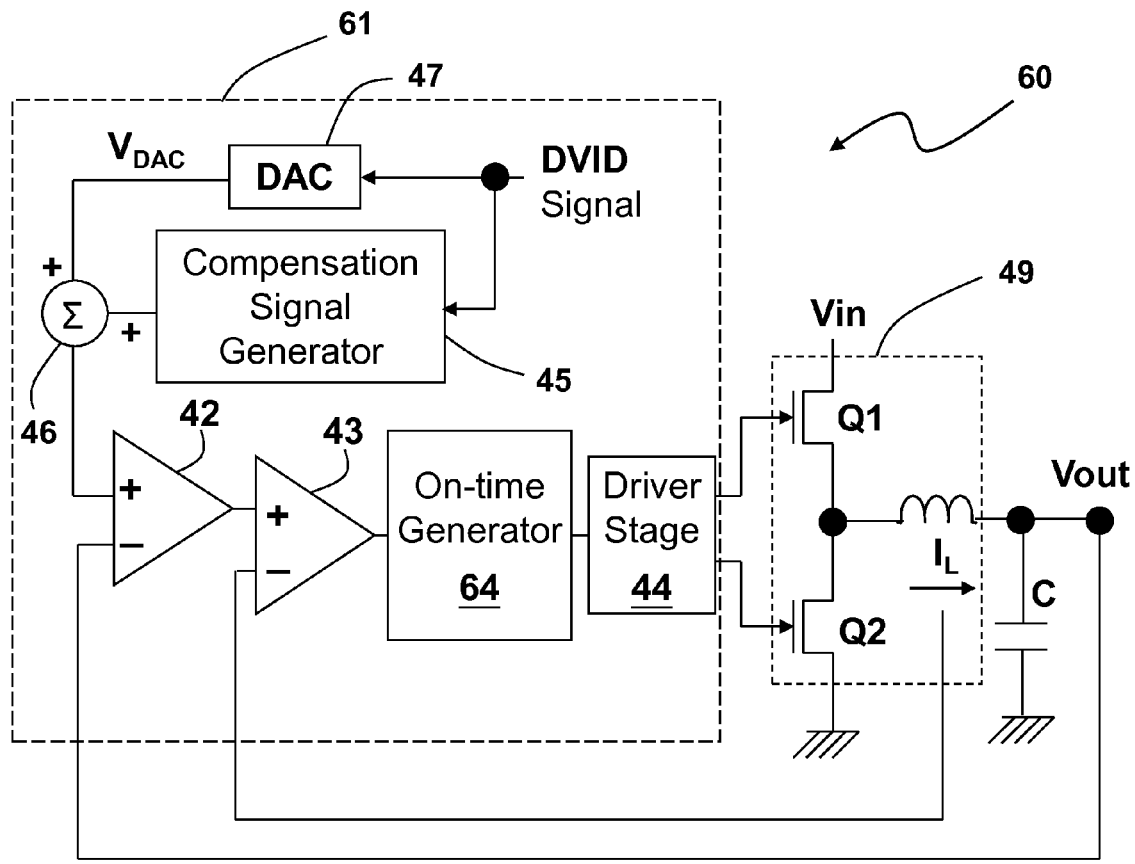
FIG. 12 shows another embodiment of the voltage regulator of the present invention.

The power stage 49 is not limited to the synchronous buck power stage illustrated in the foregoing embodiments, and it may be a synchronous or asynchronous buck power stage, a boost power stage, an inverting power stage, or a buck-boost power stage, as shown in FIGS. 11A-11J. Moreover, the power stage is not limited to operating in pulse width modulation mode as shown in the foregoing embodiments, but also can operate in other modes such as in pulse frequency modulation mode as exemplified in FIG. 12. Referring to FIG. 12, the voltage regulator 60 includes a control circuit 61 to control the power stage 49. The control circuit 61 includes an error amplifier 42, a PWM comparator 43, an on time generator 64, and a driver stage 44, and furthermore, it includes a compensation signal generator 45, an adder 46, and a DAC 47. The adder 46 adds the voltage signal $V_{DAC}$ to the compensation signal, and outputs an sum signal as a reference signal to the error amplifier 42. The error amplifier 42 compares the output voltage Vout with the sum signal to generate an error amplification signal Comp. The PWM comparator 43 compares the error amplification signal Comp with an inductor current sense signal (the inductor current sense signal also has a waveform and characteristics similar to a ramp signal, so it can be deemed as a form of ramp signal), and the comparison result triggers the on time generator 64 to generate a one-shot pulse with a constant on time. The driver stage 44 drives the power transistors Q1 and Q2 to operate according to the output signal of the on time generator 64. In such a pulse frequency modulation mode, the compensation signal also functions to accelerate the slew rate of the output voltage Vout. Similarly, the above configuration can be modified such that the output of the compensation signal generator 45 is added to the negative input terminal (added with the output voltage Vout) of the error amplifier 42, to the output of the error amplifier 42, or to the negative input terminal (added with the inductor current sense signal) of the PWM comparator 43. Moreover, the DVID signal or the compensation signal can be used to directly adjust the on time generated by the on time generator 64.

Figure 13:
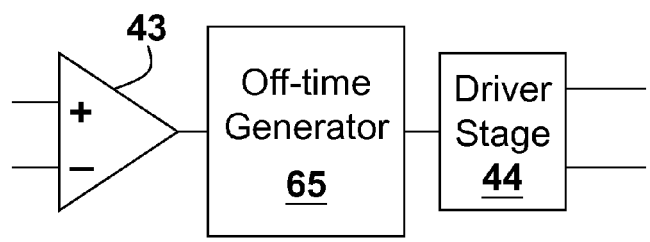
FIG. 13 shows an embodiment replacing the on-time generator of the embodiment in FIG. 12 with an off-time generator 65.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positive and negative terminals of a comparator, an error amplifier, or an operation amplifier are interchangeable. In all of the embodiments, a device or circuit which does not affect the major functions of the signals, such as a switch, etc., can be added between two circuits illustrated to be directly connected with each other. Moreover, the on time generator 64 in the embodiment of FIG. 12 can be replaced with an off time generator 65 in FIG. 13; the circuit is still a voltage regulator operating in pulse frequency modulation mode except that the constant on time is replaced with the constant off time, but the present invention is still applicable. Thus, the present invention should cover all such and other modifications and variations, which should be interpreted to fall within the scope of the following claims and their equivalents.

What is claimed is:

1. A voltage regulator, comprising:
   a power stage including at least one power transistor operating to convert an input voltage to an output voltage;
   a feedback control loop feedback controlling the operation of the power transistor according to the output voltage or a feedback signal related to the output voltage; and
   a compensation signal generator receiving a dynamic voltage identification (DVID) signal, and when the DVID signal requests the output voltage to change to a target voltage, the compensation signal generator generating a compensation signal to shorten an interval for the output voltage to reach the target voltage,
   wherein the feedback control loop includes:
      an error amplifier generating an error amplification signal according to (a) the output voltage or the feedback signal related to the output voltage and (b) a voltage signal determined by the DVID signal; and
      a pulse width modulation (PWM) comparator generating an output signal according to the error amplification signal and a ramp signal so as to directly or indirectly control the power transistor the power stage;
   wherein the compensation signal is inputted to the feedback control loop in one of the following manners:
      (1) the compensation signal being added to the error amplification signal as an input to an input terminal of the PWM comparator; or
      (2) the compensation signal being added to the ramp signal as an input to another input terminal of the PWM comparator.

2. A control method for controlling a voltage regulator to convert an input voltage to an output voltage, the control method comprising:
   providing a feedback control loop feedback controlling a conversion from an input voltage to an output voltage according to the output voltage or a feedback signal related to the output voltage;
   receiving a dynamic voltage identification (DVID) signal; and generating a compensation signal as an input to the feedback control loop to shorten an interval for the output voltage to reach a target voltage when the DVID signal requests the output voltage to change to the target voltage,
   wherein the step of generating the compensation signal as an input to the feedback control loop includes: determining whether the output voltage should be increased or decreased according to the DVID signal; generating a corresponding positive or negative current according to the determination; and converting the positive or negative current to a positive or negative voltage signal as the compensation signal.

3. A voltage regulator, comprising:
   a power stage including at least one power transistor operating to convert an input voltage to an output voltage;
   a feedback control loop feedback controlling the operation of the power transistor according to the output voltage or a feedback signal related to the output voltage; and
   a compensation signal generator receiving a dynamic voltage identification (DVID) signal, and when the DVID signal requests the output voltage to change to a target voltage, the compensation signal generator generating a compensation signal to shorten an interval for the output voltage to reach the target voltage,
   wherein the feedback control loop includes:
      an error amplifier generating an error amplification signal according to (a) the output voltage or the feedback signal related to the output voltage and (b) a voltage signal determined by the DVID signal;
      a pulse width modulation (PWM) comparator generating an output signal according to the error amplification signal and a ramp signal so as to directly or indirectly control the power transistor of the power stage; and
      a constant on-time generator or a constant off-time generator which generates a constant on time or a constant off time according to the output signal of the PWM comparator to control the power transistor,
      wherein the ramp signal is obtained by detecting an inductor current of the power stage.

4. The voltage regulator of claim 3, wherein the compensation signal generator includes a lookup table circuit which generates the compensation signal in correspondence to the DVID signal.

5. A voltage regulator, comprising:
   a power stage including at least one power transistor operating to convert an input voltage to an output voltage;
   a feedback control loop feedback controlling the operation of the power transistor according to the output voltage or a feedback signal related to the output voltage; and
   a compensation signal generator receiving a dynamic voltage identification (DVID) signal, and when the DVID signal requests the output voltage to change to a target voltage, the compensation signal generator generating a compensation signal to shorten an interval for the output voltage to reach the target voltage, wherein the compensation signal generator includes a determination circuit generating a selection signal according to the DVID signal, and a converter converting a predetermined voltage to the compensation signal according to the selection signal.

6. The voltage regulator of claim 5, wherein the predetermined voltage is a constant, or is variable in correspondence to a different value of the DVID signal.

7. The voltage regulator of claim 5, wherein the converter includes:
   a voltage to current converter generating a current according to the predetermined voltage;
   a first current mirror mirroring the current to generate a positive current;
   a second current mirror mirroring the current to generate a negative current;
   a selection circuit selecting the positive current or the negative current according to the selection signal; and
   a current to voltage converter converting the positive current or the negative current to a positive or negative voltage signal as the compensation signal according to the selection by the selection circuit.

8. A control circuit for controlling a voltage regulator to convert an input voltage to an output voltage, the control circuit comprising:
   a error amplifier generating an error amplification signal according to (a) the output voltage or a feedback signal related to the output voltage and (b) a voltage signal determined by a dynamic voltage identification (DVID) signal;
   a pulse width modulation (PWM) comparator generating an output signal according to the error amplification signal and a ramp signal so as to directly or indirectly control a conversion from the input voltage to the output voltage;
   a constant on-time generator or a constant off-time generator which generates a constant on time or a constant off time according to the output signal of the PWM comparator; and
   a compensation signal generator receiving the DVID signal, and when the DVID signal requests the output voltage to change to a target voltage, the compensation signal generator generating a compensation signal to shorten an interval for the output voltage to reach the target voltage, wherein the compensation signal is inputted in one of the following manners:
   (1) the compensation signal being added to the feedback signal as an input to an input terminal of the error amplifier;
   (2) the compensation signal being added to the voltage signal determined by the DVID signal as an input to another input terminal of the error amplifier;
   (3) the compensation signal being added to the error amplification signal as an input to an input terminal of the PWM comparator; or
   (4) the compensation signal being added to the ramp signal as an input to another input terminal of the PWM comparator.

9. The control circuit of claim 8, wherein the compensation signal generator includes a lookup table circuit which generates the compensation signal in correspondence to the DVID signal.

10. A control method for controlling a voltage regulator to convert an input voltage to an output voltage, the control method comprising:
   providing a feedback control loop feedback controlling a conversion from an input voltage to an output voltage according to the output voltage or a feedback signal related to the output voltage;
   receiving a dynamic voltage identification (DVID) signal; and generating a compensation signal as an input to the feedback control loop to shorten an interval for the output voltage to reach a target voltage when the DVID signal requests the output voltage to change to the target voltage, wherein the step of generating the compensation signal as an input to the feedback control loop includes: looking up a table to generate the compensation signal in correspondence to the DVID signal.

11. A control circuit for controlling a voltage regulator to convert an input voltage to an output voltage, the control circuit comprising:
   a error amplifier generating an error amplification signal according to (a) the output voltage or a feedback signal related to the output voltage and (b) a voltage signal determined by a dynamic voltage identification (DVID) signal;
   a pulse width modulation (PWM) comparator generating an output signal according to the error amplification signal and a ramp signal so as to directly or indirectly control a conversion from the input voltage to the output voltage; and
   a compensation signal generator receiving the DVID signal, and when the DVID signal requests the output voltage to change to a target voltage, the compensation signal generator generating a compensation signal to shorten an interval for the output voltage to reach the target voltage, wherein the compensation signal generator includes a determination circuit generating a selection signal according to the DVID signal, and a converter converting a predetermined voltage to the compensation signal according to the selection signal, and wherein the compensation signal is inputted in one of the following manners:
   (1) the compensation signal being added to the feedback signal as an input to an input terminal of the error amplifier;
   (2) the compensation signal being added to the voltage signal determined by the DVID signal as an input to another input terminal of the error amplifier;
   (3) the compensation signal being added to the error amplification signal as an input to an input terminal of the PWM comparator; or
   (4) the compensation signal being added to the ramp signal as an input to another input terminal of the PWM comparator.

12. The control circuit of claim 11, wherein the predetermined voltage is a constant, or is variable in correspondence to a different value of the DVID signal.

13. The control circuit of claim 11, wherein the converter includes:
   a voltage to current converter generating a current according to the predetermined voltage;
   a first current mirror mirroring the current to generate a positive current;
   a second current mirror mirroring the current to generate a negative current;
   a selection circuit selecting the positive current or the negative current according to the selection signal; and a current to voltage converter converting the positive current or the negative current to a positive or negative voltage signal as the compensation signal according to the selection by the selection circuit.

14. A control method for controlling a voltage regulator to convert an input voltage to an output voltage, the control method comprising:

providing a feedback control loop feedback controlling a conversion from an input voltage to an output voltage according to the output voltage or a feedback signal related to the output voltage;

receiving a dynamic voltage identification (DVID) signal; and generating a compensation signal as an input to the feedback control loop to shorten an interval for the output voltage to reach a target voltage when the DVID signal requests the output voltage to change to the target voltage, wherein the feedback control loop includes:

an error amplifier generating an error amplification signal according to (a) the output voltage or the feedback signal related to the output voltage and (b) a voltage signal determined by the DVID signal; and a pulse width modulation (PWM) comparator generating an output signal according to the error amplification signal and a ramp signal so as to directly or indirectly control a conversion from the input voltage to the output voltage;

wherein the compensation signal is inputted to the feedback control loop in one of the following manners:

(1) the compensation signal being added to the error amplification signal as an input to an input terminal of the PWM comparator; or (2) the compensation signal being added to the ramp signal as an input to another input terminal of the PWM comparator.

* * * * *